E. A. KINGSLEY & K. O. CARLSON.
COIN OPERATED AUTOMATIC PIANO.
APPLICATION FILED MAR. 3, 1909.
1,071,640.
Patented Aug. 26, 1913.
7 SHEETS—SHEET 5.
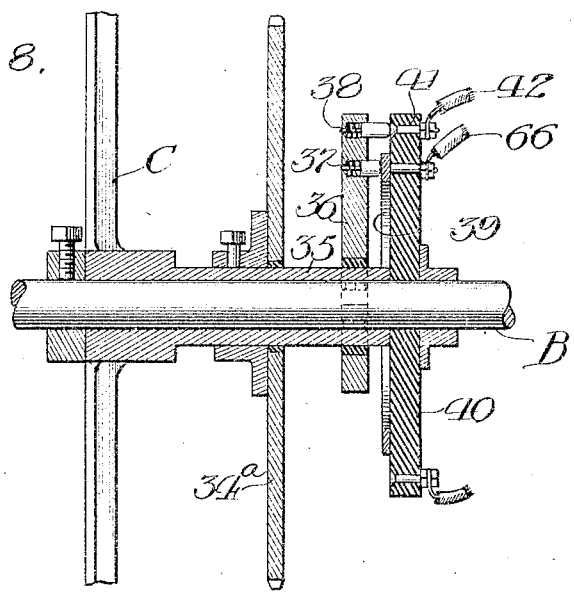
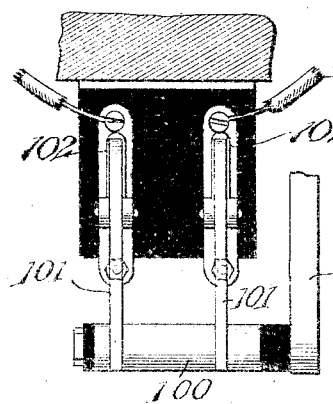
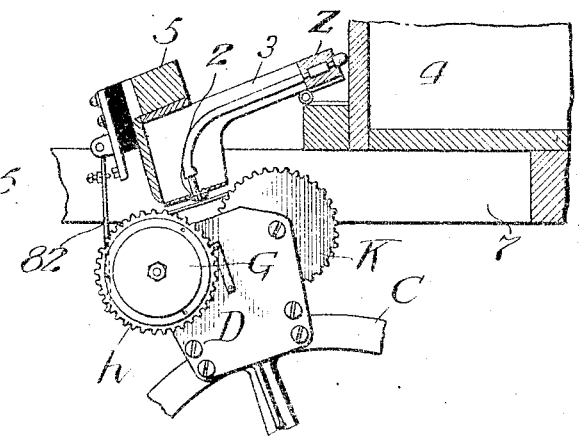
Witnesses
Inventors
Edwin A. Kingsley
Karl O. Carlson
by Frank D. Thomason
atty

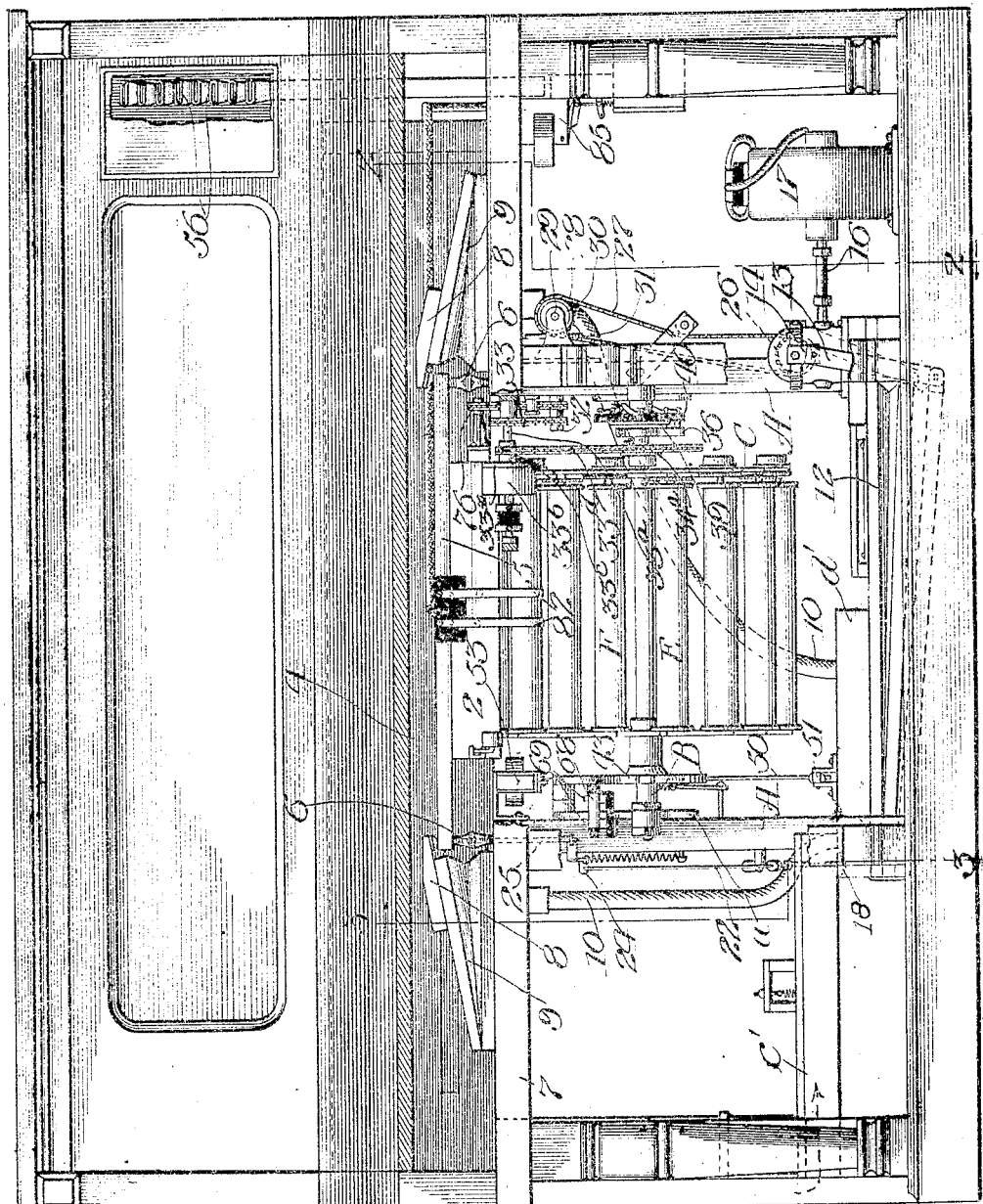

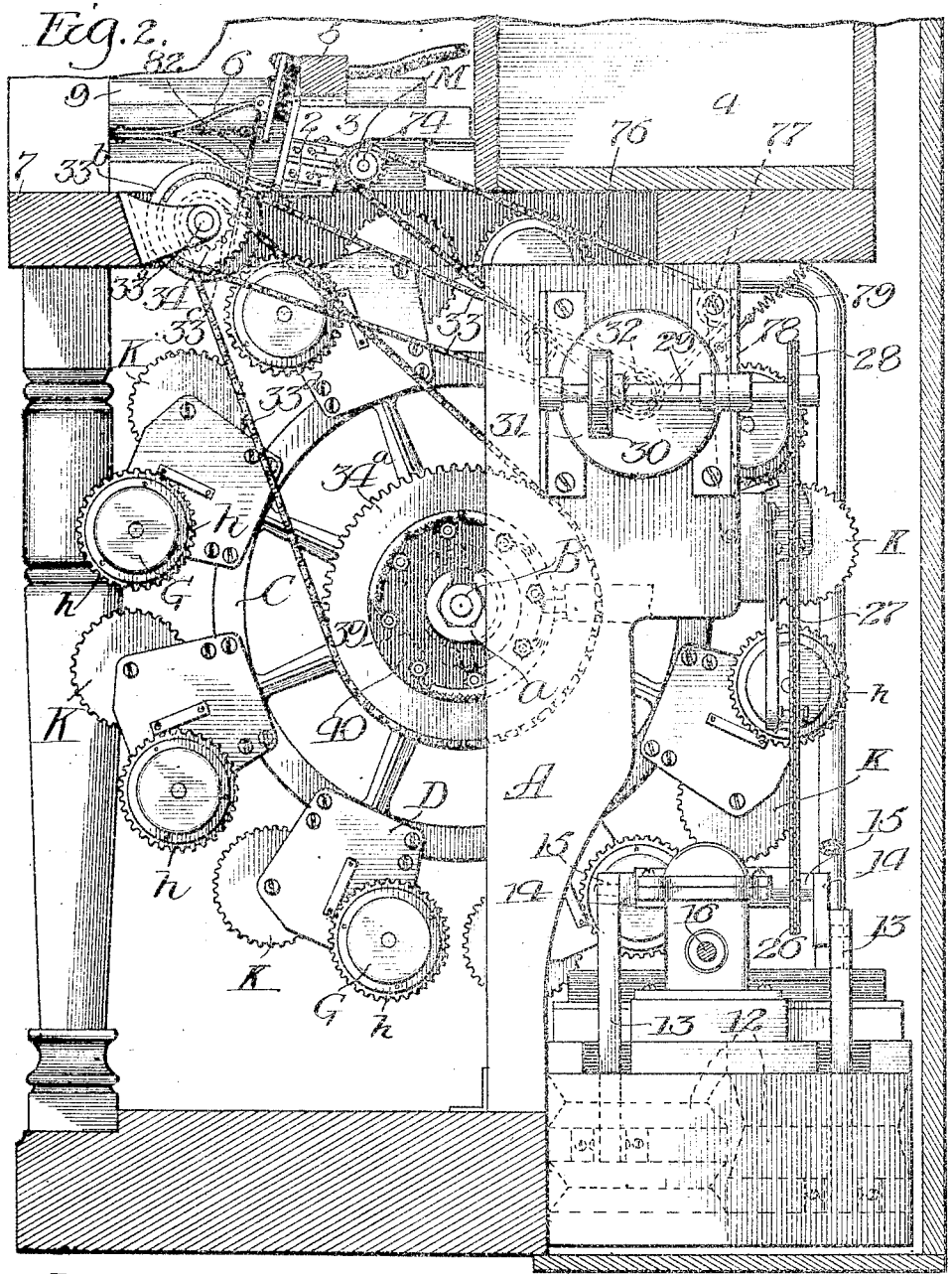

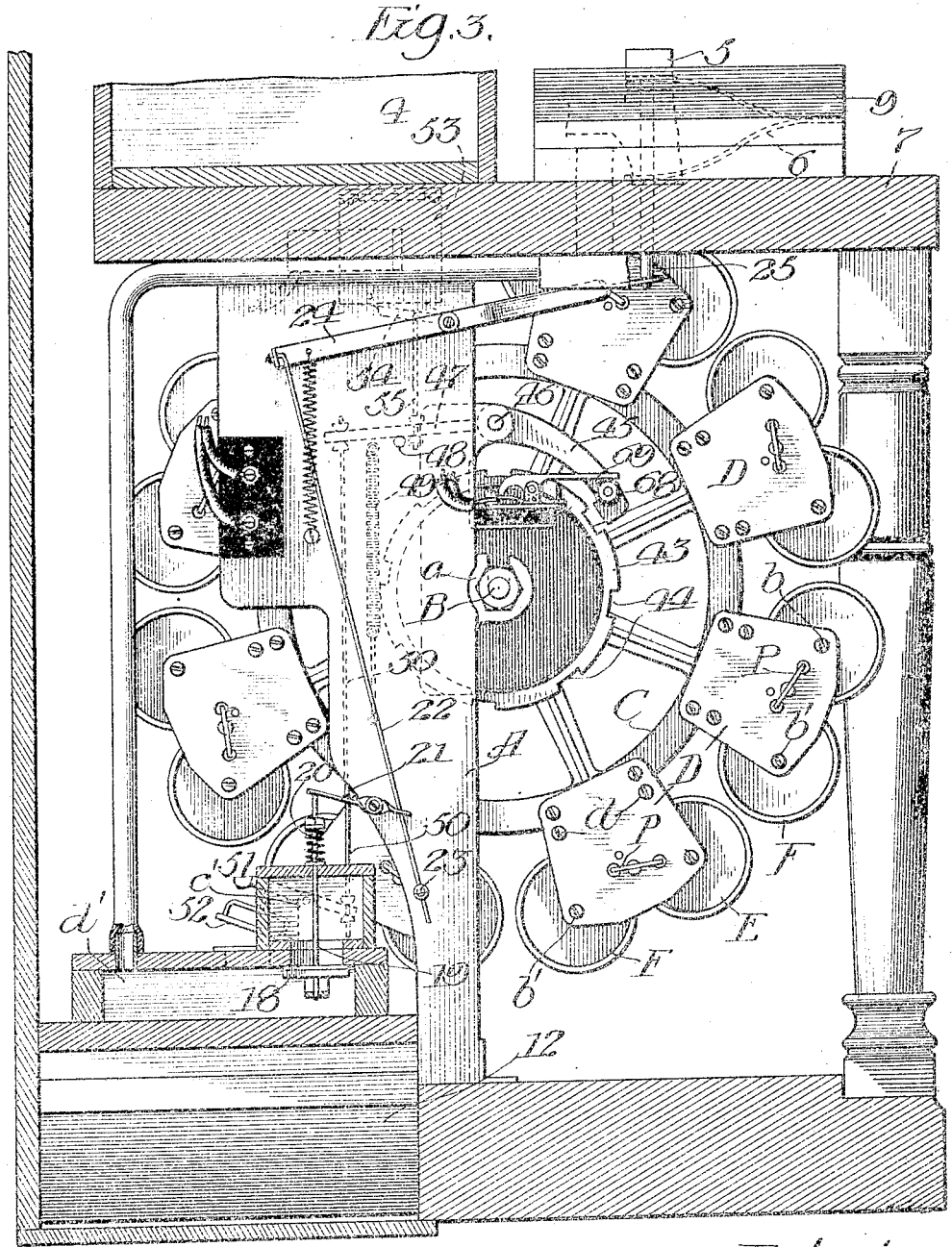

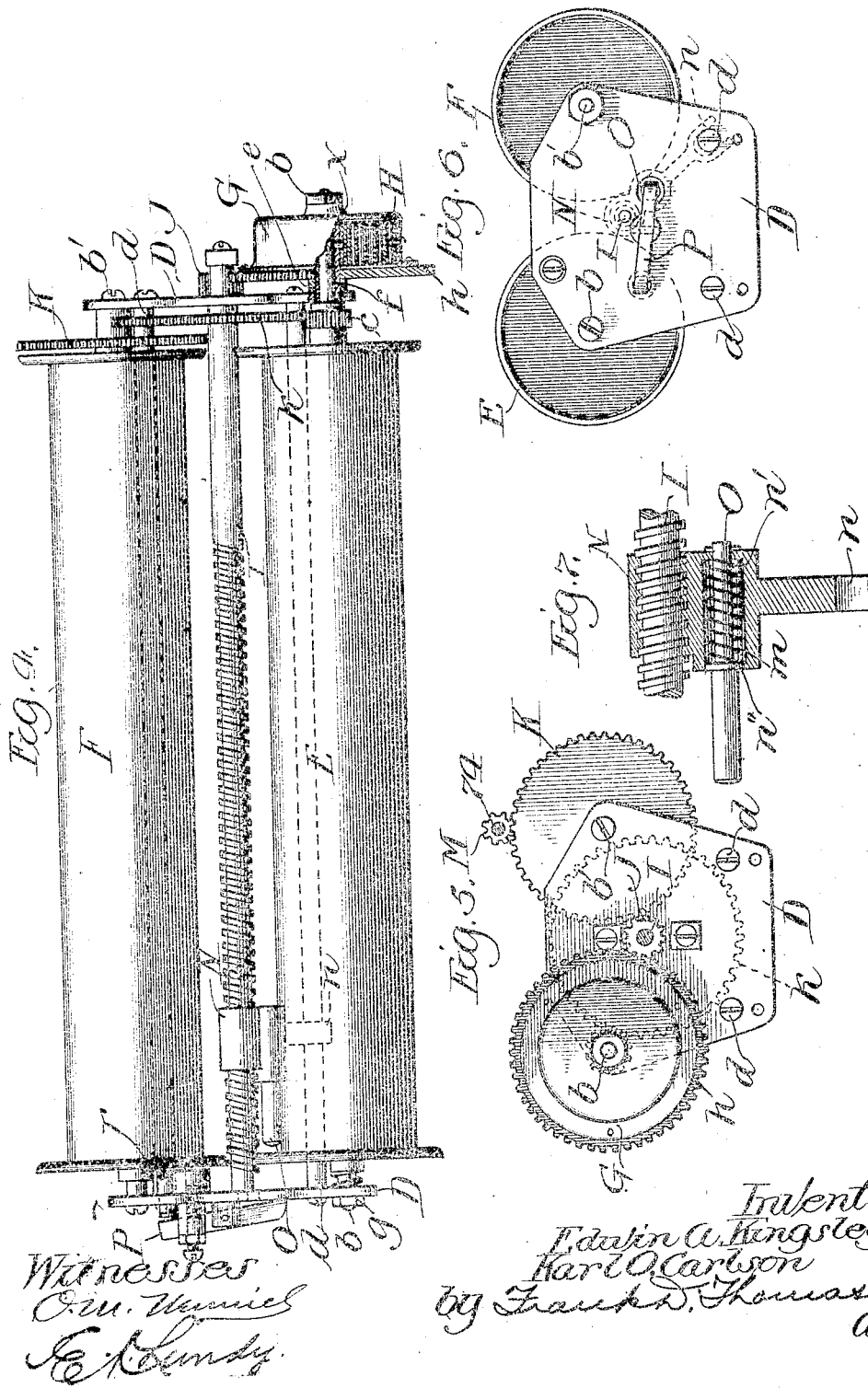

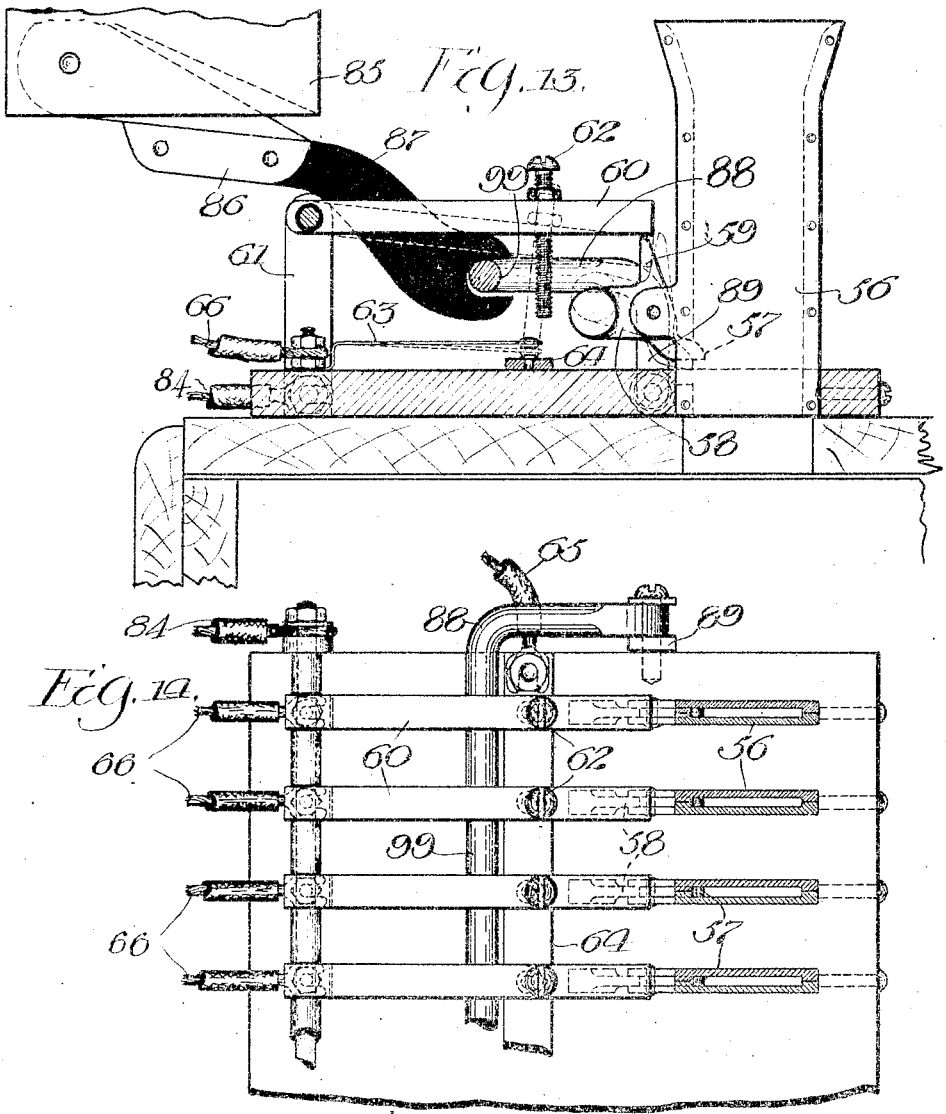

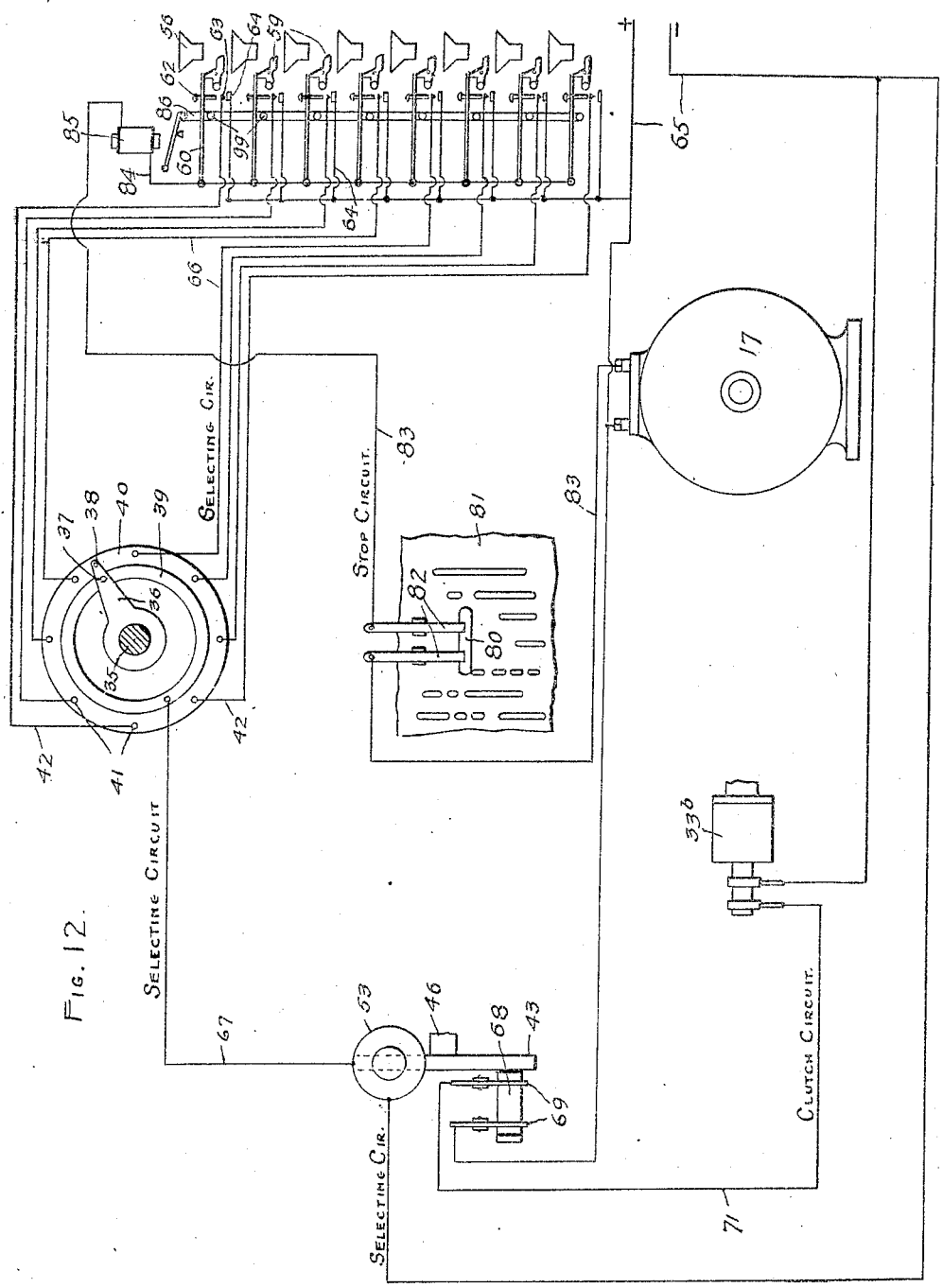

UNITED STATES PATENT OFFICE.

EDWIN A. KINGSLEY AND KARL O. CARLSON, OF CHICAGO, ILLINOIS, ASSIGNORS, BY MESNE ASSIGNMENTS, TO NATIONAL PIANO MANUFACTURING COMPANY, OF GRAND RAPIDS, MICHIGAN, A CORPORATION OF ILLINOIS.

COIN-OPERATED AUTOMATIC PIANO.

1,071,640.

Specification of Letters Patent. Patented Aug. 26, 1913.

Application filed March 3, 1909. Serial No. 481,068.

*To all whom it may concern:*

Be it known that we, EDWIN A. KINGSLEY and KARL O. CARLSON, citizens of the United States, and residents of Chicago, in the county of Cook and State of Illinois, have invented certain new and useful Improvements in Coin-Operated Automatic Pianos, of which the following is a clear, full, and exact description.

Our invention relates to automatic pianos, and particularly the kind that can be made to automatically play any one of a repertoire of musical compositions, by depositing a coin in one of several slots.

One of the objects of our invention is to provide means whereby the piano can be made to play the composition desired by merely depositing the coin in the slot designating the title of such composition, and dispensing with the push-button for imparting the initial impulse to set into operation the devices for moving the carrier into proper position and bring the tracker-board into engagement with the roll of music it is desired to play, and start the operation of the piano. Besides the above there are other objects accomplished by our invention which will hereinafter more fully appear, including an economy of construction. All this we are enabled to accomplish by the means hereinafter fully described and as particularly pointed out in the claims.

In the drawings:—Figure 1 is a front elevation of our invention showing the framework and the case of the same below the keyboard broken away to expose to view the mechanism thereof and the novel features of our invention applied thereto. Fig. 2 is a vertical section taken on dotted line 2—2 of Fig. 1, looking in the direction indicated by the arrows, and drawn to a larger scale. Fig. 3 is a vertical section taken on dotted line 3—3, looking in the direction of the arrows, and also drawn to a larger scale. Figs. 4, 5, 6, and 7 show, respectively, a plan, end views, and a section of a fragmentary part, of one of the carriers for supporting and providing bearings for the spools for delivering and receiving the roll of music as it is being played. Fig. 8 is a section of a fragmentary part of the music roll carrier frame showing on an enlarged scale the music selecting devices. Fig. 9 is a fragmentary view showing the construction of the electrical devices used in connection with our invention. Fig. 10 is a plan view of a portion of the music roll disclosing connecting metallic plates attached thereto. Fig. 11 is a fragmentary view showing a portion of the carrier frame and the tracker-board in cross section and in engagement with the roll of music carried by the same. Fig. 12 is a diagrammatical view disclosing the electrical scheme involved in our invention. Fig. 13 is a fragmentary view of the mechanism embodying our invention showing in side elevation the electrical devices actuated by the coin for starting the motor, etc. Fig. 14 is a plan view of the same.

The drawings disclose the case and framework of an automatic piano so constructed as to provide a suitable support for, and permit of the assembling of the various parts of our invention, and, as this may be varied from time to time to permit of the changes in the arrangements of the electrical elements and possibly physical changes of construction of the mechanical devices of our invention, we do not desire to be herein considered as claiming any part of this as our invention. Among other features this framework is provided, mediate the ends of the piano with a couple of stanchions A, A, which are provided with bearings a, a, for the ends of a horizontal shaft B, on which the revoluble roll carrying frame for the carriers of the music rolls is mounted. This carrier frame comprises two circular frames C, and the carriers for the music rolls are removably secured to the rims thereof. There is a series of these carriers, preferably, as shown in the drawings, and they are arranged at equal distances apart, and each consists of shield-shaped end-plates D, that are screwed or otherwise removably secured to the rims of the circular-frames C and are suitably connected by spacing-bars d. Near their outer angles these plates D are provided with bearings for the stationary shafts b, b' upon one of which the spool E for the music roll is mounted and upon the other of which the take-up spool F is mounted. The music roll spool E has a small pinion c secured to the sleeve extending from the head at and between this pinion and the adjacent frame D of the carrier, and shaft b is surrounded by a suitable spacing collar e. This shaft extends through frame D, and through the bore of a tubular boss $f$ which latter is screwed into said frame D. One end of said shaft is screw-threaded and provided with a suitable nut, $g$ and lock-nut if desired, by means of which, and the nut $g'$ on its opposite screw-threaded end, the shaft $b$ is secured in position. The outer end of said boss $f$ is, preferably provided with a head $x$, and between this head and frame D it is surrounded by a suitable bell-shaped casing G, which is loosely mounted thereon and surrounds and incloses a suitable clock spring H, whose inner end is secured to boss $f$ and whose outer end is secured to the inner circumference of said casing.

Rigidly secured to the flanged edges of the mouth of the case G, is a gear $h$ that engages a pinion J on the adjacent extended end of a shaft I, which latter is journaled in frames D, D, and extends parallel to and between shafts $b$ and $b'$. Immediately next the inner surface of the adjacent frame D, shaft I is provided with a comparatively large gear $k$ which meshes with the pinion $c$. The take-up or receiving spool has a comparatively large gear K on its boss, which is engaged by a pinion M, whose shaft is journaled in bearings attached to the frame of the tracker-board, when the latter is at the limit of its downward movement, substantially as hereinafter more fully described. When gear K is thus engaged the roll of music is wound upon spool F and unwound from spool E, which latter, as it revolves, imparts motion through the medium of pinion $c$, gear $k$, pinion J and gear $h$ to case G and revolves and winds up spring H. When pinion M moves out of engagement with gear K the unwinding of spring H will cause the roll of music to automatically rewind on spool E. To prevent the finish of this rewinding action from being too rapid, and to reduce the speed of and stop the rewinding at the proper moment, the portion of shaft I, farthest from the end on which pinion J is secured, is screw-threaded, preferably, more than half its length. A block N is mounted on this shaft, whose screw-threaded bore engages the threaded portion of said shaft and moves in one direction or the other, according to the direction the shaft is revolving. One side of block N is provided with a tubular enlargement that has a longitudinal bore $m$, in which the reduced end of a plunger O reciprocates longitudinally, and said block also has a laterally projecting arm $n$, whose outer end is bifurcated and passes on either side of one of rods $d$, to prevent said boss from revolving with shaft I. The portion of the plunger within bore $m$ has a coil expansion-spring $n'$ on it, which expands between the closed end of said bore, and the collar $n''$ closing the open end thereof so as to keep said plunger at the limit of its movement in the opposite direction. Plunger O extends through a suitable opening in the adjacent frame D, and when spool E is rewinding the roll of music and block N moves toward the frame said plunger will pass through the opening in said frame, and engage one end of a short rocking-bar P, and rock the same so that its opposite branch will press a spring-returnable brake-pin, $r$, longitudinally against the adjacent end of the receiving spool F and retard the revolution thereof and finally stop the same altogether. This pin, $r$, is inclosed and has reciprocal movement within a suitable cylindrical casing that is connected or made integral with frame D. In operation, as the receiving spool F winds the roll of music upon it, block N moves slowly away from the rocking-bar, and it would require a very long piece of music to move it the length of the screw-threaded portion of shaft I. This block is so positioned on shaft I that the braking action of pin, $r$, would take place at the proper time.

The tracker-board 2 is of the conventional construction and is carried by a frame comprising end-pieces 3 whose forward portions are extended downward and whose lower edges are connected by said tracker-board. The rear edges of these end-pieces are connected by a perforated bar Z arranged parallel to the tracker-board, that is hinged either to the lower forward portion of the exhaust air-chest 4, or to a suitable portion of the frame-work of the piano. The perforations of the tracker-board are connected by suitable flexible tubular connections with said air-chest so as to allow of a limited downward movement of the tracker-board, to bring the same into engagement with the roll of music mounted in the carrier C at a point between the delivery and take-up spools E and F. The forward edges of end-pieces 3 of the tracker-frame are, preferably, connected by a horizontal bar 5, the ends of which extend beyond and overhang end pieces 3 a suitable distance and rest upon springs 6, which latter may be either of the prone V-shape shown in the drawings, or any other shape desired. These springs are supported upon a horizontally disposed board or platform 7, that extends substantially the length of the piano, and to which the upper ends of stanchions A are secured. The tracker-board is moved downward into engagement with the music roll by means of fingers 8, that are secured to the top of pneumatics 9, 9, that are arranged longitudinally upon and supported by said platform 7. During the operation of the piano the air is kept exhausted from the pneumatics 9, through the medium of pipe 10 and air-chamber $d'$, from which latter the air is drawn by the action of a quadruple exhaust pneumatic 12. This pneumatic 12 is located below the carrier and has an upper stationary top upon which air-chamber $d'$ is mounted. These quadruple pneumatics consist of two bellows 12, 12, each having double compartments, and are operated by means of pitmen 13, 13, whose upper ends are connected to cranks 14 on the ends of the horizontal shaft 15, driven, through the medium of a flexible shaft 16, by a suitable electric motor 17. Air-chamber $d'$ is connected to another air-chamber $c'$, which latter communicates through the medium of vertically disposed air-shafts or trunks with the air-chest 4. Now in order to prevent the exhaust from the air-chest until after the tracker-board is moved downward into engagement with the roll of music, we close the orifice connecting chambers $c'$ and $d'$ by a valve 18, which is seated against the lower edges of said opening. Valve 18 has a vertically disposed spindle 19 that extends up through the roof of chamber $c'$, where it is surrounded by an expansion-spring 20, the upper end of which bears against a suitable nut and normally keeps the valve at the limit of its upward movement, and this passage between the two chambers closed. The upper end of spindle 19 extends above spring 20 and is engaged by one end of a trip 21, consisting of a short bar which is pivoted mediate its ends to the adjacent stanchion A, and has its end opposite that engaged by spindle 19 flattened and provided with a perforation up through which a vertically disposed rod 22 passes. At a suitable point below trip 21, rod 22 is provided with a suitable bead or nut 23, which, when said rod is moved longitudinally upward a suitable distance, engages the trip and moves it so that it depresses spindle 19 and opens valve 18. The upper end of rod 22 is pivotally connected to the adjacent end of a rocking-bar 24 that is fulcrumed about midway its length to the said stanchion A and extends forward to and terminates under the overhanging end of the finger 8. The forward end of bar 24 is flattened and provided with a perforation in which the lower reduced end of a vertically disposed reciprocal rod 25 is seated, which latter extends up through suitable guide openings in platform 7, and terminates just below the overhanging ends of the bar, 5, carried by the tracker-board frame. Thus when the tracker-board frame is depressed by the action of the pneumatics 9, 9, rod 25 depresses the rocking-bar 24, and raises rod 22, which latter does not affect valve 18 until the tracker-board has moved downward into engagement with the roll of music.

Before the tracker-board will be brought into engagement with the roll of music the carrier frame C automatically revolves to the proper position to bring the music it is desired to play into proper position, and then it is automatically halted and held stationary until the music has been fully played. To accomplish this result shaft 15 is, near its rear end, provided with a suitable sprocket 26 that is connected by the chain 27 to a sprocket 28 on the rear end of a horizontal shaft 29, which latter is journaled in suitable bearings secured to the stanchion nearest the motor. This shaft is provided with a longitudinally adjustable friction-wheel 30, the periphery of which engages the adjacent face of a friction-gear 31 mounted on the end of a drive-shaft 32, that is journaled in suitable bearings and has its axis above and parallel to the adjacent end portion of shaft B. The opposite end of this shaft 32 has a small sprocket thereon and is connected by a chain 33 to a sprocket 34 which is securely mounted on a horizontal idle-shaft $33^a$. This idle-shaft is journaled in suitable bearings, and, near the end adjacent to the tracker-board has an electric clutch $33^b$ mounted thereon, the driving part of which is secured fast to the idle-shaft and the driven part $33^x$ of which is loose on said shaft. The loose driven part of this clutch has a sprocket $33^c$ secured rigidly thereto, and this sprocket is connected by a suitable chain $33^d$ to a large sprocket $34^a$ that is rigidly mounted on the extension 35 of the boss of the adjacent circular-frame C of the music carrier frame. This tubular extension 35 extends beyond the sprocket $34^a$ a suitable distance and is provided with an insulated arm 36, which, near its extremity is provided with two transverse spring-seated contact-pins 37 and 38. The contact-pin 37, nearest shaft B has its outer end in constant contact with a metal annulus 39, which latter is concentrically mounted upon a fixed plate 40 of insulating material, and constitutes the negative terminal of a music-selecting circuit. The outer end of contact-pin 38 extends to and comes in contact with the adjacent surface of the fixed plate 40, at a point beyond the circumference of annulus 39, and as the sprocket and carrier revolve comes in contact with equi-distant terminal posts 41, one after the other, each of which posts is connected by a wire 42 (forming one of a plurality of selecting circuits 66) to a spring contact member 63 adjacent its respective coin-chute, substantially as hereinafter more fully described. The circular frame C of the music carrier, at the end opposite sprocket $34^a$, also has its boss extended toward the adjacent bearings, and has secured to the end of this boss a wheel 43 whose perimeter has, instead of the conventional teeth, a series of equi-distant notches 44 the number and relative location of which correspond to that of the terminal contact-posts 41. These notches are adapted to be engaged by the off-set end or detent of pawl 45, the boss of which is pivoted upon a stud 46 suitably secured to and projecting from the adjacent stanchion A, substantially as shown. Pawl 45 has a rearward extension 47, the downward movement of which is stopped by a pin 48 projecting from the stanchion and thus is normally retained at the limit of its downward movement by a contraction spring 49 connecting it to the stanchion A at a suitable point below the same, substantially as shown by dotted lines in Fig. 3. The rear end of this extension 47 is connected by means of a connecting rod 50 to the forward end of a rocking-bar 51, which latter is fulcrumed between standards secured to and rising from the air-chamber $d'$. The opposite or rear end of this rocking-bar is provided with valve 52 that engages and is adapted to open and close an opening in the roof of said chamber. When the carrier is caused to revolve to the proper point where the desired piece of music can be engaged by the tracker-board by depositing a coin in the slot indicated by the title of said piece of music, substantially as hereinafter more fully explained, a magnet, 53, will become energized, and its armature 54 that is connected to the extension 47 by a rod 55, will lift said extension and bring the detent of the pawl 45 into engagement with the proper notch, 44, of the ratchet 43, and thus arrest the further movement of the music carrier frame. When this takes place valve 52 will automatically close, and the tracker-board frame will move downward and bring said tracker-board into engagement with the music roll so selected.

In order to accomplish the operation of the mechanism hereinbefore described the piano is provided with a series of coin-chutes 56 that are located, preferably, near one end of the piano above the plane of the key-board and have their widened intake mouths constitute the slots, arranged one above the other, into any one of which the coin necessary to actuate the said mechanism is deposited. There is the same number of these chutes 56 as there are music rolls on the carrier frame and they are each designated by the title of the particular pieces of music with which it is identified. The lower end portion of each coin-chute is vertically disposed and the narrowest side-wall of each is provided with a slot through which projects one end 57 of a three branched trip or escapement. This escapement is pivoted between suitable lugs projecting from said chute. One of the branches 58 of this escapement projects in an opposite direction to, but in substantially the same horizontal plane as the point 57, and is weighted, and its function is to normally keep point 57 projecting into the passageway of the chute traversed by the coin, and keep the third point 59 of the escapement under the adjacent end of a bar 60. The latter is pivoted at its opposite end to a suitable standard 61, substantially as shown in Fig. 13 of the drawings, and at a suitable point along its length it has a screw 62 tapped vertically down through it, the lower end of which is adapted to engage a leaf-spring contact 63 when said bar 60 is at the lower end of its movement. The opposite end of this contact is secured to a binding-post for the adjacent terminal of selecting-circuit 66, and its end is depressed into engagement with a suitable terminal strip 64 by screw 62 when bar 60 falls, and thus closes the circuit 65 in which the motor is connected. The dropping of the bar 60, to effect this closing of the circuit 65, in the manner just stated, is accomplished by the falling coin striking point 57, and moving the point 59 out from under the adjacent end of the said bar in which position the escapement is held by the end of the bar 60 impinging against the back edge of point 59. At the same time the circuit 65 is closed the selecting-circuit 66 belonging to the particular chute with which the escapement just described coöperates, is closed. Each chute is provided with its individual escapement, presser-bar, and leaf-spring contact 63, and each contact 63 is connected by its individual wire in circuit 66 to one of the binding-posts 41 of disk 39. When the carrier frame has moved sufficiently to bring the contact-pin 38 carried by the insulated arm 36, into engagement with the binding-post 41 of the circuit 66 the current passes into and through said arm and pin 37 into annulus 39, and then through the single wire 67 constituting part of a member of the circuit which energizes magnet 53, as shown in dotted lines in Fig. 3. When this is done the armature 54 raises extension 47 of the pawl 45, through the medium of the rod 55, and causes the detent of said pawl 45 to engage the notch of the wheel 43 and stops the movement of the music carrier frame so that the carrier for the selected music sheet will stop where it can be engaged by the tracker-board. From the magnet 53 the single wire of the selecting-circuit extends to and connects with circuit 65, and thus completes the selecting-circuit, whenever the contact-pin 38 and the proper binding-post 41 come into contact.

Near the detent on the end of pawl 45 the latter is provided with a lateral stud on which a roller 68 having an insulated metallic circumference is journaled. This roller, 68, is adapted to engage the underside of the longer branches of two corresponding pivoted insulated switch-bars 69, 69, when the pawl is at the limit of its movement away from the ratchet, and thus keep the hooked ends of said switch-bars in engagement with the brush terminals 70, of a clutch circuit 71. This latter circuit has the electric clutch 33$^b$ connected up with it, which latter, as heretofore explained, imparts motion through the medium of the chain 33$^d$ to the larger gear 34$^a$ of the carrier frame shaft. This clutch-circuit is energized from the same source as the motor-circuit by the action of the coin-engaging escapement, when the coin passes through the chute, and causes the clutch to engage and transmit the motion of shaft 33$^a$ through the medium of sprocket 33$^c$ and chain 33$^d$ to the carrier frame. When pawl 45 engages the ratchet 43 the hooked ends of the switch-bars 69 automatically move out of contact with the terminals 70, and break the clutch-circuit, whereupon the parts of said clutch automatically disengage, leaving the sprocket 33$^c$ inert and loose upon shaft 33$^a$. When the tracker-board comes in contact with the music roll, a small pinion M, which is fast on a shaft 74 journaled in suitable bearings back of and parallel with the said board, engages the large gear K secured directly or indirectly to the take-up spool F, and revolves the latter so that said music roll is wound upon the same during the operation of the piano. Shaft 74 extends beyond the end of the tracker-board frame adjacent to drive-shaft 32, and is connected to and driven by the latter through the medium of a sprocket on its end by a belt 76. Belt 76 is passed around an idler 77 journaled in the movable end of a pivoted arm 78, that has a coiled contraction spring 79 connected thereto, and together therewith, constitutes a belt-tightener that operates to keep the chain 76 taut, while at the same time accommodating the movement of the tracker-board frame to and from the music roll. When the music roll has been wound upon the spool F until the composition is finished, the further revolution of said take-up spool will be instantly stopped, and the motor-circuit and the selecting-circuit will be automatically opened, by virtue of a thin metallic connecting plate 80, attached to the music roll 81 near its end, coming in contact with the brushes 82, 82 of a stop-circuit 83. Circuit 83 is in two parts one of which is connected to the source of electric energy through a magnet 85 at one end and the opposite end extends to one of the brushes 82. From the latter, when engaged by plate 80, the current passes into the other of said brushes, 82, and from thence by a suitable wire to the negative binding-post, from whence, over the negative wire of the circuit, the current returns to its source. When the magnet 85 becomes energized it moves its pivoted armature 86 upward. This armature is provided with a downwardly curved extension 87 made of insulating material, the lower end of which is connected by a rod 99 to a yoke 88, the ends of which latter are pivoted in suitable standards 89, that are secured to the end of the platform upon which the terminal strip 64, the chutes 56, and conjunctive devices are supported. When the yoke 88 is moved upward by the action of said armature 86, the part of the yoke extending transversely under the bars 60, engages the latter and lifts them sufficiently so that the gravity of the weighted end of the escapements will cause the latter to move back to their original positions, in which position their points 59 will come under and support the movable ends of said bars, and thus open the circuits as hereinbefore described. The tracker-board frame will automatically return to its original position, the roll of music will rewind upon the spool E, and the other elements of the mechanism will be automatically reset so that the piano will be otherwise placed in condition to repeat the same or other musical selections, when another coin is deposited in one or the other of said chutes.

What we claim as new is:—

1. In a machine of the kind specified, a revoluble frame, a series of equi-distant music-roll-carriers carried thereby, a disk arranged concentric with but insulated from the shaft of said frame, and having a series of independent contacts and an annular contact mounted thereon, means revolving with said frame connecting said annular and other contacts, devices for energizing the circuits in which said contacts are located, and mechanism actuated by one of said circuits that stops said frame.

2. In a machine of the kind specified, a revoluble frame, a series of equi-distant music roll carriers carried thereby, a disk arranged concentric with but insulated from the shaft of said frame, and having a series of independent contacts and an annular contact mounted thereon, an arm insulated from but revolving with said frame and contacts carried thereby connecting said annular and other contacts, devices for energizing the circuits in which said contacts are located, and mechanism actuated by one of said circuits that stops said frame.

3. In a machine of the kind specified, a revoluble frame, a series of equi-distant music roll carriers carried thereby, a disk arranged concentric with but insulated from the shaft of said frame, and having a series of independent contacts and an annular contact mounted thereon, an arm insulated from but revolving with said frame and yielding contacts carried thereby connecting said annular and other contacts, devices for energizing the circuits in which said contacts are located, and mechanism actuated by one of said circuits that stops said frame.

4. In a machine of the kind specified a revoluble frame, a series of music roll carriers carried thereby, means for revolving said frame, electrical devices operatively connected to said frame, mechanism actuated by said devices for stopping said frame at a predetermined point, a tracker-board, and means for moving said tracker-board toward said frame.

5. In a machine of the kind specified a revoluble frame, a series of music roll carriers carried thereby, means for revolving said frame, electrical devices operatively connected to said frame, mechanism actuated by said devices for stopping said frame at a predetermined point, an overhead downwardly movable tracker-board, and means for moving said tracker-board toward said frame.

6. In a machine of the kind specified, a revoluble frame, driving mechanism for said magazine including an electric clutch, a series of equi-distant music roll carriers carried thereby, a disk arranged concentric with but insulated from the shaft of said frame, and having a series of contacts and an annular contact mounted thereon, means revolving with said frame connecting said annular and other contacts, devices for energizing the circuits in which said contacts are located, and mechanism actuated by one of said circuits that stops said frame and disengages the parts of said clutch.

7. In a machine of the kind specified, a revoluble frame, driving mechanism for said magazine including an electric clutch, a series of equi-distant music roll carriers carried thereby, a disk arranged concentric with but insulated from the shaft of said frame, and having a series of contacts and an annular contact mounted thereon, an arm insulated from but revolving with said frame, and contacts carried thereby connecting said annular and other contacts, devices for energizing the circuits in which said contacts are located, and mechanism actuated by one of said circuits that stops said frame and disengages the parts of said clutch.

8. In a machine of the kind specified a revoluble frame, a series of music roll carriers carried thereby, means for revolving said frame, electrical devices operatively connected to said frame, mechanism actuated by said devices for stopping said frame at a predetermined point, a tracker-board mounted to move toward said frame, and pneumatic devices for moving said tracker-board.

9. In a machine of the kind specified, a revoluble frame, a series of music roll carriers carried thereby, means for revolving said frame, electrical devices operatively connected to said frame, mechanism actuated by said devices for stopping said frame at a predetermined point, a tracker-board mounted to move toward said frame and electrically controlled pneumatic devices for moving said tracker-board.

10. In a machine of the kind specified, a revoluble frame, a series of music roll carriers carried thereby, means for revolving said frame, electrical devices operatively connected to said frame, mechanism actuated by said devices for stopping said frame at a predetermined point, a tracker-board adapted to move toward said frame, an exhaust chest, pneumatic devices for moving said tracker-board and devices for exhausting the air from said chest.

11. In a machine of the kind specified, a revoluble frame, a series of music roll carriers carried thereby, means for revolving said frame, electrical devices operatively connected to said frame, mechanism actuated by said devices for stopping said frame at a predetermined point, an overhead downwardly movable tracker-board adapted to move toward said frame, and pneumatic devices for moving said tracker-board.

12. In a machine of the kind specified, a revoluble frame, a series of music-roll-carriers carried thereby, means for revolving said frame, electrical devices operatively connected to said frame, mechanism actuated by said devices for stopping said frame at a predetermined point, an overhead downwardly movable tracker-board adapted to move toward said frame, and electrically controlled pneumatic devices for moving said tracker-board.

13. In a machine of the kind specified, a revoluble frame, a series of music roll carriers carried thereby, means for revolving said frame, electrical devices operatively connected to said frame, mechanism actuated by said devices for stopping said frame at a predetermined point, an overhead downwardly movable tracker-board adapted to move toward said frame, an exhaust chest communicating with said tracker-board, and pneumatic devices for moving said tracker-board and devices for exhausting the air from said chest.

14. In a machine of the kind specified, a revoluble frame, a series of music-roll carriers carried thereby, means for revolving said frame, a wheel revoluble with the same having recesses in its perimeter, a pawl therefor normally out of engagement with the same, and electrical devices for stopping the frame at any predetermined point.

15. In a machine of the kind specified, a revoluble frame, a series of music roll carriers carried thereby, means for revolving said frame, a plurality of electric circuits each representing one of said carriers, means for energizing one of said circuits at a time, separate mechanism actuated by said devices that stops said frame at a predetermined point, a tracker-board, and devices independent of the other mechanism for moving said tracker-board toward said frame.

16. In a machine of the kind specified a revoluble frame, a series of music roll carriers carried thereby, means for revolving said frame, a plurality of electric circuits each representing one of said carriers, means for energizing one of said circuits at a time, separate mechanism actuated by said devices that stops said frame at a predetermined point, an overhead downwardly movable tracker-board, and devices independent of the other mechanism for moving said tracker-board toward said frame.

17. In a machine of the kind specified, a revoluble frame, driving mechanism for said frame including an electric clutch, a series of equi-distant music roll carriers carried thereby, a disk arranged concentric with but insulated from the shaft of said frame, and having a series of individual contacts and an annular contact mounted thereon, means revolving with said frame connecting said annular contact and individual contacts, a multiple circuit the branches of which connect respectively with said contacts, a series of devices each of which energizes one of the branches, and mechanism actuated by the engagement of one of said individual contacts with said annular contact that stops said frame and disengages the parts of the clutch and means for operating said mechanism.

18. In a machine of the kind specified, a revoluble frame, driving mechanism for said frame including an electric clutch, a series of equi-distant music roll carriers carried thereby, a disk arranged concentric with but insulated from the shaft of said frame and having a series of individual contacts and an annular contact mounted thereon, an arm insulated from but revoluble with said frame, contacts carried thereby connecting said annular contact and individual contacts, a multiple circuit the branches of which connect respectively with said contacts, a series of devices each of which energizes one of the branches, and mechanism actuated by the engagement of one of said individual contacts with said annular contact that stops said frame and disengages the parts of said clutch and means for operating said mechanism.

19. In a machine of the kind specified, a revoluble frame, a series of carriers for the music sheets mounted thereon, means for revolving said frame, a separate wheel revoluble with the same having recesses in its perimeter, a pawl operative therewith but normally out of engagement with the same, devices for determining the point at which said frame shall stop, and electrical means for causing said pawl to engage said wheel when said stoppage point is reached.

20. In a machine of the kind specified, a revoluble frame, a series of carriers for the music sheets mounted thereon, a tracker-board adapted to move toward and from said frame, means for revolving said frame, a separate wheel revoluble with the same having recesses in its perimeter, a pawl operative therewith but normally out of engagement therewith, devices for determining the point at which said frame shall stop, and electrical means for causing said pawl to engage said wheel when said stoppage point is reached.

21. In a machine of the kind specified, a revoluble frame, a series of carriers for the music sheets mounted thereon, an overhead tracker-board adapted to move to and from said frame, means for revolving said fram a wheel revoluble with the same having recesses in its perimeter, a pawl operative therewith but normally out of engagement with the same, devices that automatically determine the point at which said frame shall stop after the machine is set in motion, and electrical means for causing said pawl to engage said wheel when said stoppage point is reached.

22. In a machine of the kind specified, a revoluble frame, means for revolving the same, a tracker-board, electrically controlled devices for stopping the revolution of said frame, pneumatic apparatus, a valve therefor controlled by said electrical devices through the medium of which said pneumatic apparatus moves said tracker-board downward immediately after the stopping of said frame, and then exhausts the air from said pneumatic apparatus.

23. In a machine of the kind specified, a revoluble frame means for rotating the same, an overhead tracker-board and support therefor, bellows, a movable element of which has arms engaging said frame, electrically controlled devices for stopping the revolution of said frame, pneumatic apparatus, a valve therefor controlled by said electrical devices through the medium of which said apparatus is adapted to move said tracker-board downward immediately after the stopping of said frame.

In testimony whereof we have hereunto set our hands and seals this 8th day of January, A. D. 1909.

EDWIN A. KINGSLEY. [L. s.]
KARL O. CARLSON. [L. s.]

Witnesses:
 FRANK D. THOMASON,
 E. K. LUNDY.